United States Patent
Hurlburt

[15] 3,660,971

[45] May 9, 1972

[54] MOWER BLADE SHARPENING MEANS

[72] Inventor: Joseph C. Hurlburt, Leola, Pa.

[73] Assignee: Sperry Rand Corporation, New Holland, Pa.

[22] Filed: Aug. 24, 1970

[21] Appl. No.: 66,430

[52] U.S. Cl. ..............................................56/291, 51/250
[51] Int. Cl. ......................................................A01d 55/24
[58] Field of Search .......................56/17.5, 290, 291, 244; 51/250

[56] References Cited

UNITED STATES PATENTS

| 3,561,202 | 2/1971 | Tupper | 56/291 |
| 2,362,400 | 11/1944 | Randle | 51/250 |
| 3,136,107 | 6/1964 | Spear | 56/17.5 X |
| 2,621,455 | 12/1952 | Stevens | 51/250 |
| 2,399,437 | 4/1946 | Herbert | 51/250 |

FOREIGN PATENTS OR APPLICATIONS

| 1,004,844 | 9/1965 | Great Britain | 51/250 |
| 571,803 | 9/1945 | Great Britain | 56/244 |

Primary Examiner—Russell R. Kinsey
Assistant Examiner—J. N. Eskovitz
Attorney—C. Hercus Just, Joseph A. Brown, John C. Thompson, James J. Kennedy and George C. Bower

[57] ABSTRACT

A mower having a sharpening abrasive member for engagement by the cutting blades of the mower during movement of the blades in operation, the abrasive member being mounted so as to permit adjustment to orient the operative face of the abrasive member with the surfaces of the blades to be abraded to sharpen the cutting edges.

3 Claims, 4 Drawing Figures

PATENTED MAY 9 1972 3,660,971
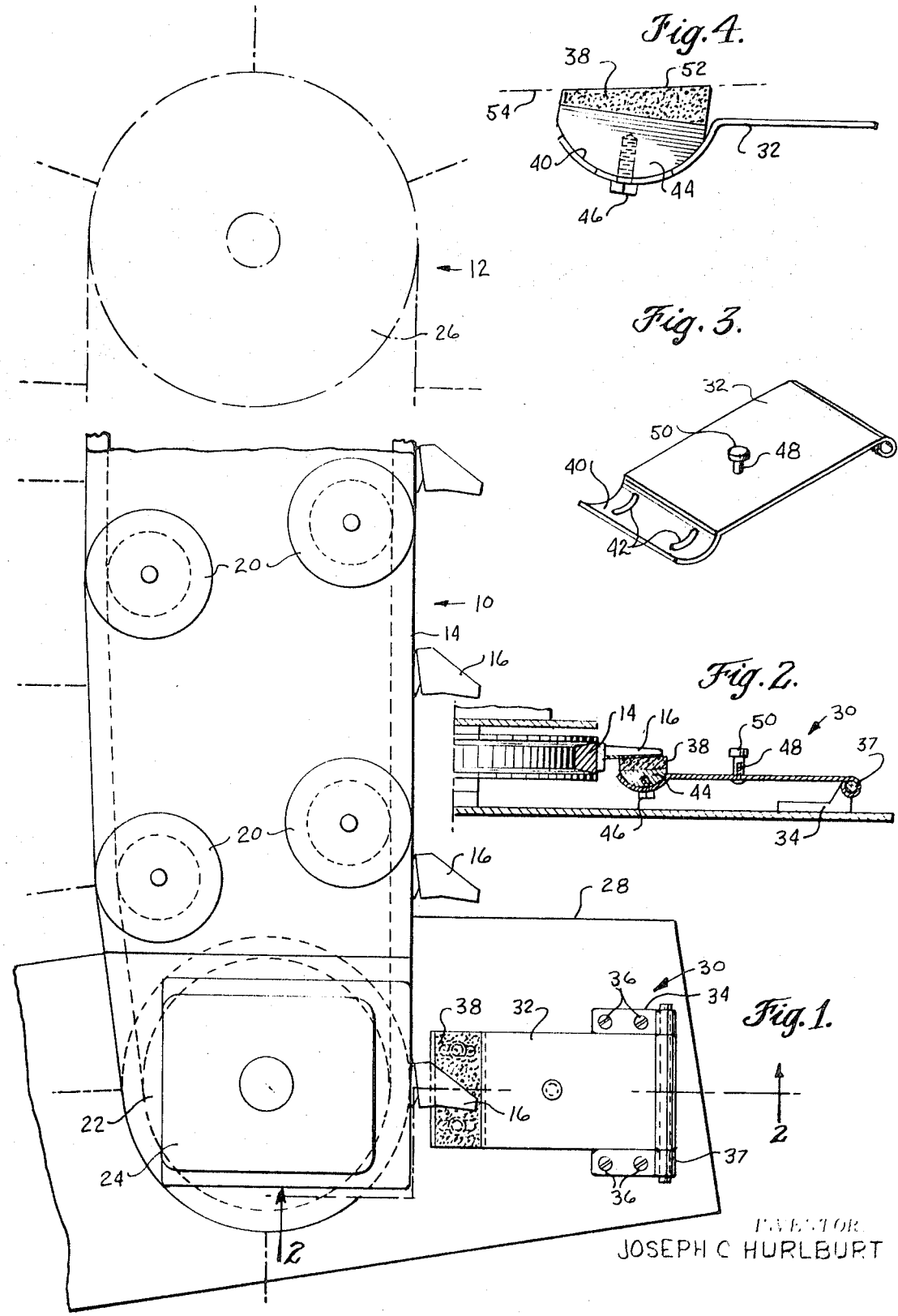
INVENTOR
JOSEPH C HURLBURT

MOWER BLADE SHARPENING MEANS

BACKGROUND OF THE INVENTION

One of the most essential characteristics in a mower for agricultural crops and the like, and especially mowers employing impact type blades, is that the cutting edges of the blades be sharp. Such characteristic also is desirable in so-called sickle-bars on various types of mowing devices, which are widely employed at present and are provided with slotted fingers which are spaced transversely along the supporting frame for reception of reciprocating cutter blades which produce a shearing action relative to the stationary fingers. Essentially however, the operation of impact type cutter blades in a mower is similar to the operation of a hand sickle or scythe, in which it is solely the engagement of the cutting edge of the cutter knife against the material being cut which severs the same. Accordingly, it is desirable to maintain such cutting blades relatively sharp at all times.

A type of mower which is popular at present for the cutting or harvesting of forage crops and the like is one in which an endless flexible member, such as a belt or link chain is movable with respect to guide and support sheaves of various types, including a drive sheave and a number of idler sheaves, and upon which a series of outwardly projecting impact type cutter blades are mounted in space relationship to each other. The sheaves are so arranged that a course of the endless flexible member defines the forward or cutting edge of the mower, along which the cutter knives move at high speed in a direction transverse to the path of movement of the mower over a field which is being mowed or harvested.

When new blades are mounted in a mower said type, such as by substituting a new set upon a belt for a set which has become worn, said blades initially are sharp. Maintaining them in sharp condition has been accomplished heretofore by providing an abrasive member such as a Carborundum block, for example, in fixed position relative to a stationary part of the mower. The abrasive member has an operative face over which the cutting edge of each blade is drawn or passes incident to the blades moving in their normal path of movement during a mowing operation. Under such circumstances, the operative face of the abrasive member becomes worn and, correspondingly, the cutting edges of the blades are worn to a limited extent incident to becoming sharpened. Following such a sharpening period of operation of the mower, the abrasive member may be moved a limited distance, to inoperative position and is again restored to operative position when further sharpening is required.

It is well known that when a new set of blades is substituted for a worn set, and especially if the mower is provided with a worn or partially used abrasive member, the operative face on the abrasive member usually is not parallel to the planes of the cutting edges of the blades of the new set. Accordingly, if the worn cutting member is used to attempt to sharpen such replacement cutter blades with the operative face of the abrasive members in such non-parallel position to the faces of the cutter blades which are to be sharpened thereby, usually only a more or less spot contact is effected between the sharpening member and the cutter blades. Accordingly, in addition to not effecting any worthwhile amount of sharpening of the blades, the blades will become unduly worn at one location and remain unsharpened along the rest of the length of the cutting edge, while at the same time an uneven or grooved abrasive surface will be developed upon the abrasive member due to the limited engagement of the cutter blades therewith.

Under the foregoing circumstances, in mowing machines which employ cutter blades of the type referred to, which are supported by an endless flexible member such as a belt and are movable relative to an abrasive member for sharpening the same, it is necessary that each time a new set of blades is substituted for a worn set, the abrasive member must also be replaced by a new one, having an operative surface disposed in parallel relationship with the surfaces of the cutter blades which are to be sharpened thereby.

SUMMARY OF THE INVENTION

It is the principal object of the present invention to provide blade sharpening means upon a mower in which a plurality of blades, and particularly blades of the impact type, are moved along a predetermined path which passes over the operative surface of an abrasive member in which an abrasive member is adjustably supported in a manner to permit the operative surface thereof to be disposed precisely in parallel relationship with the surfaces of the cutter blades which are to be sharpened thereby as they pass over said operative surface of the abrasive member.

It is another object of the invention to provide supporting means for said aforementioned abrasive member which has a seat engageable by the abrasive member in a manner to permit shifting of the angle of the operative face of the abrasive member relative to said supporting means.

It is a further object of the invention to provide an arcuate seat upon said supporting means and said abrasive member having a complimentary surface engageable with said arcuate seat to permit shifting of the abrasive member about an axis substantially parallel to the path of movement of the blades relative to said abrasive member.

It is still another object of the invention to provide suitable securing means between the abrasive member and supporting means therefor whereby an adjusted position of the abrasive member relative the supporting means may be maintained until it is desired to change the relationship therebetween.

Details of the foregoing objects and of the invention, as well as other objects thereof, are set forth in the following specification and illustrated in the accompanying drawing comprising a part thereof.

DESCRIPTION OF THE DRAWING

FIG. 1 is a fragmentary, partly diagrammatic and foreshortened plan view of a belt type mower which embodies a cutter blade sharpening device which embodies the principles of the present invention.

FIG. 2 is a fragmentary, vertical sectional view of the mower and sharpening device illustrated in FIG. 1 as seen on the line 2—2 of said figure.

FIG. 3 is a perspective view of an exemplary supporting member for the abrasive member of the sharpening device otherwise illustrated in the preceding views.

FIG. 4 is an enlarged, exemplary fragmentary end view of the sharpening device, illustrating the manner in which a worn abrasive member may be adjusted relative to the supporting member to dispose the abrasive face thereof in desired operating position.

DESCRIPTION OF THE PREFERRED EMBODIMENTS

Referring to FIG. 1, a top plan view of one end of a cutter bar 10 of an agricultural mowing machine or device is shown in full lines, while in phantom and in foreshortened manner, the opposite end 12 of the cutter bar is also illustrated. Said cutter bar is the type utilizing and endless flexible member 14, such as a v-belt, link chain, cable, or otherwise upon which a series of impact-type cutter blades 16 are mounted for movement along the forward face 18 of the cutter bar 10 to effect impact cutting of forage crops and the like. To guide the endless flexible member 14, a series of idler pulleys 20 are rotatably supported by the frame of the cutter bar 10 and, in one end of said frame, a driving sheave 22 is supported and is powered, for example, by a gear box 24, which derives power from a tractor, P. T. O. of an agricultural implement to which the cutter bar 10 is connected. An idler sheave 26 is supported at the opposite end of the cutter bar from the driving sheave 22 and the belt passes around both of said sheaves.

The end of the cutter bar 10 which is connected to a supporting and driving implement, such as the end which includes the gear box 24 also is operatively connected to a guide shoe 28, which is fixed relative to the frame of the cutter bar 10. Such guide shoe forms highly suitable means to support a blade sharpening unit 30 which comprises the principal features of the present invention, details of which are set forth below.

The blade sharpening unit 30 comprises support means in the form of a resilient supporting blade or arm 32 which is connected to a bracket 34, that is secured to the guide shoe 28 by screws 36 or the like. The connection between the bracket 34 and arm 32 preferably comprises a hinge 38 to retain the sharpening unit 30 connected to the cutter bar at all times, yet permits ready manipulation of the same, such as effecting an adjustment of the abrasive member 38 relative to the seat 40 upon the outer end of arm 32 opposite the hingedly connected end thereof.

For simplicity, the supporting arm 32 may be stamped and otherwise shaped from sheet metal and the seat 40 preferably is concave with respect to an axis of the arc which is disposed transversely to the longitudinal axis of the arm 32 and thereby is parallel to the path of movement of the blades 16. The seat is also provided with a plurality of slots 42 which extend transversely to the axis of the seat 40. The abrasive member 38 preferably is composite and comprises a block of suitable abrasive material such as Carborundum, or other appropriate material. Said block is secured, by suitable cement or otherwise, to an arcuate base member 44, which may be composed of metal, synthetic resin or the like and capable of receiving clamping means such as a plurality of clamping screws 46, which extend through the slots 42 into threaded bores formed in member 44. The resiliency of arm 32 provides limited yieldability between abrasive member 32 and the blades during operation thereof.

When it is desired to dispose the sharpening unit 30 in operative position with respect to the surfaces of the cutting blades 16 which are to be abraded so as to sharpen the cutting edges of said blades, the supporting arm 32 is moved away from the guide shoe 28 to dispose the operative upper face of the abrasive member 38 in position to be engaged by those surfaces of the blades which are to be abraded thereby. This is accomplished by suitable means such as a screw or bolt 48 which extends through a threaded hole in the arm 32 and lower end of the bolt is engageable with the upper surface of the guide shoe 28.

The bolt 48 is threaded downwardly against the guide shoe 28 until the operative surface of abrasive member 38 is disposed in position to be successively engaged by blades 16 as the same move along their predetermined path around the cutter bar end incident to a mowing operation being undertaken. After a limited interval of time, all of the blades will be similiarly sharpened and when this has been accomplished, the bolt 48 may be relaxed from engagement with the guide shoe 28, whereupon the abrasive member 38 will move downwardly by gravity so as to be out of contact with the blades 16 during their continued movement around the cutter bar 10. If desired, a lock nut 50 may be provided on the bolt 48 for engagement with the supporting arm 32 when a desired position of adjustment has been reached.

Under normal circumstances, when the abrasive member 38 is new, it will be substantially of uniform thickness as illustrated in exemplary manner in FIG. 2. However, after a certain period of use, particularly in regard to repeated sharpening of the blades of a certain belt, and especially at the time the belt is ready to be discarded and replaced by another belt with new blades thereon or replacement of the blades upon a used belt, it usually is found that the worn, operative surface of abrasive member 38 is no longer parallel to the opposite surface thereof which is connected to the base member 44, for example. Such an irregular relationship is illustrated in exemplary manner in FIG. 4. Thus, if such a worn blade were positioned in its usual position relative to the path of the blades 16 of a new belt which are to be sharpened thereby, it usually will be found that the upper, worn surface of the abrasive member 38 will not be parallel to those surfaces of the blades which are to be abraded thereby. Thus, only a spot or line or on otherwise very limited area of the blade surface to be sharpened will be in contact with the upper, operative surface of the worn abrasive member 38. This will result in no substantial sharpening of the blade occurring, and in addition, the operative surface of the abrasive member 38 will have a groove or other form of irregular surface worn therein, for example.

To obviate the foregoing unsatisfactory situation, the adjustable positioning of the abrasive member 38 and its base member 44 with respect to the seat 40, due to the complimentary arcuate shapes thereof, will permit the exemplary, angularly disposed worn operative surface 52 of the abrasive member 38 to be disposed in parallel relationship with the plane 54, shown in broken lines in FIG. 4, which is the exemplary plane within which the surfaces of new blades on a replacement belt will move when mounted upon the cutter bar 10. Under such circumstances, it is possible to prolong the useful life of the abrasive member 38 as well as always insure that the operative surface thereof is maintained within the operative plane of movement of the surfaces of the cutter blades which are to be abraded to sharpen the blades while belt 14 is traversing its path of movement around the cutter bar 10.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. Sharpening means for the blades of a mower in which a plurality of similar blades move in an endless path during cutting operation, said sharpening means comprising in combination, an abrasive member having an operative face adapted to be engaged successively by surfaces partially defining the cutting edges of a series of similar blades of a mower, support means for said abrasive member adapted to be mounted upon the cutter head of a mower adjacent the path of movement of the cutting blades thereof, and arcuate seat means formed on said support means and adapted to connect said abrasive member to said support means adjustably about the longitudinal axis of said arcuate seat so as to position said operative face of said member within a plane parallel to a surface of said member within a plane parallel to a surface of said cutting blades to be abraded by said member to sharpen the cutting edges of said blades as the same move past said abrasive member.

2. The sharpening means according to claim 1 in which said seat is provided with at least one slot which extends transversely to the longitudinal axis of said arc of said seat, and a clamping screw means extends through said slot and is operable relative to said abrasive member to secure the same in adjusted position relative to said seat.

3. The sharpening means according to claim 2 in which said abrasive member is composite and includes a base member attached to an abrasive block, said clamping screw means being operable relative to said base member.

* * * * *